US009070274B2

(12) United States Patent
Bermudez et al.

(10) Patent No.: US 9,070,274 B2
(45) Date of Patent: Jun. 30, 2015

(54) METHOD FOR EARLY DETECTION OF COOLING-LOSS EVENTS

(71) Applicant: International Business Machines Corporation, Armonk, NY (US)

(72) Inventors: Sergio A. Bermudez, Cronton on Hudson, NY (US); Hendrik Hamann, Yorktown Heights, NY (US); Fernando J. Marianno, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/890,673

(22) Filed: May 9, 2013

(65) Prior Publication Data

US 2014/0333443 A1    Nov. 13, 2014

(51) Int. Cl.
| | |
|---|---|
| G08B 17/00 | (2006.01) |
| G08B 21/00 | (2006.01) |
| G05B 21/00 | (2006.01) |
| F24F 3/14 | (2006.01) |
| F24F 11/00 | (2006.01) |
| G08B 21/18 | (2006.01) |

(Continued)

(52) U.S. Cl.
CPC ............ *G08B 21/182* (2013.01); *G08B 21/245* (2013.01); *G08B 23/00* (2013.01); *Y04S 10/30* (2013.01); *Y04S 20/227* (2013.01); *G05B 2219/2642* (2013.01); *G06F 1/20* (2013.01)

(58) Field of Classification Search
CPC .... G08B 21/182; G08B 21/245; G08B 23/00; G08B 17/117; Y02E 60/74; Y04S 10/30; G05B 2219/2642; G05B 23/0221; G05D 23/1934; G05D 23/1928; G05D 23/1932; F24F 11/006; G03G 15/2064; H05K 7/20; H05K 7/20745; H05K 7/2079; G01K 13/00; G01K 1/16
USPC ............. 340/584, 604, 627, 552, 568.1, 602, 340/534, 539.22, 539.26; 700/275, 291, 700/295, 90; 702/62, 45, 51, 98, 99, 185, 702/188; 361/679.33, 679.46; 454/187, 454/184; 62/119, 310; 236/44 A, 1 B, 1 C; 714/25
See application file for complete search history.

(56) References Cited

U.S. PATENT DOCUMENTS 5,598,971 A * 2/1997 Winther et al. ............. 236/44 A
8,072,780 B1   12/2011 Roy
(Continued)

OTHER PUBLICATIONS

H.F. Hamann, Uncovering energy-efficiency opportunities in data centers, 2009, IBM J. Res. & Dev., vol. 53, No. 3, pp. 10:1-10:12.
(Continued)

*Primary Examiner* — Mirza Alam
(74) *Attorney, Agent, or Firm* — Cantor Colburn LLP; Vazken Alexanian

(57) ABSTRACT

A method of detecting cooling-loss event early is provided. The method includes defining a relative humidity limit and change threshold for a given space, measuring relative humidity in the given space, determining, with a processing unit, whether the measured relative humidity is within the defined relative humidity limit, generating a warning in an event the measured relative humidity is outside the defined relative humidity limit and determining whether a change in the measured relative humidity is less than the defined change threshold for the given space and generating an alarm in an event the change is greater than the defined change threshold.

8 Claims, 4 Drawing Sheets

(51) Int. Cl.
 *G08B 21/24* (2006.01)
 *G08B 23/00* (2006.01)
 *G06F 1/20* (2006.01)

(56) References Cited

U.S. PATENT DOCUMENTS

| | | | |
|---|---|---|---|
| 8,469,782 B1* | 6/2013 | Roy | 454/187 |
| 2009/0259345 A1 | 10/2009 | Kato et al. | |
| 2011/0061015 A1* | 3/2011 | Drees et al. | 715/771 |
| 2011/0082599 A1 | 4/2011 | Shinde et al. | |
| 2011/0100618 A1* | 5/2011 | Carlson | 165/287 |
| 2011/0178963 A1* | 7/2011 | Hartman et al. | 706/12 |
| 2012/0069514 A1* | 3/2012 | Ross | 361/679.33 |
| 2012/0101648 A1* | 4/2012 | Federspiel et al. | 700/291 |

OTHER PUBLICATIONS

Hendrik F. Hamann, et al., Data Center Metrology and Measurement-Based Modeling Methods, 2012, IBM T. J. Watson Research Center, pp. 1-70.

Sunil Kumar Vuppala, A Scalable WSN based Data Center Monitoring Solution with Probabilistic Event Prediction, 2012, IEEE Computer Society, DOI 10.1109/AINA.2012.94, pp. 446-453.

Sensirion, Testing Guide, May 2010, Version 1.2, www.sensirion.com, pp. 1-3.

2008 ASHRAE Environmental Guidelines for Datacom Equipment—Expanding the Recommended Environmental Envelope, Society of Heating, Refrigerating and Air-Conditioning Engineers, Inc. (www.ashrae.org), 11 pgs.

* cited by examiner

METHOD FOR EARLY DETECTION OF COOLING-LOSS EVENTS

This invention was made with Government support under Contract No.: DEEE0002897 awarded by Department of Energy. The Government has certain rights in this invention.

BACKGROUND

The present invention relates to a method and system for early detection of cooling-loss events.

In instrumented buildings, such as data centers that house multiple computing devices, temperature sensors monitor the air temperature in the enclosed space where the computing devices are held. Generally, the alarm systems of such buildings are based only on temperature readings of those temperature sensors. A problem with this approach is that temperature sensors typically have large thermal constants due to the fact that they often have a strong thermal coupling to the thermal mass of their housing. This leads to the temperature sensors having characteristically slow response times to changes in air temperature. Thus, the alarm systems, which are based on the temperature readings of the temperature sensors, may also be characteristically slow to initiate.

The resulting delay between a temperature increase in the buildings and the initiation of the alarm systems can be relatively long and may lead to damage to delicate or temperature sensitive tools, such as information technology (IT) equipment.

SUMMARY

According to one embodiment of the present invention, a method of detecting cooling-loss events is provided. The method includes defining a relative humidity limit and change threshold for a given space, measuring relative humidity in the given space, determining, with a processing unit, whether the measured relative humidity is within the defined relative humidity limit, generating a warning in an event the measured relative humidity is outside the defined relative humidity limit and determining whether a change in the measured relative humidity is less than the defined change threshold for the given space and generating an alarm in an event the change is greater than the defined change threshold.

According to another embodiment, a method of detecting cooling-loss events is provided. The method includes defining relative humidity and temperature limits and change thresholds for a given space, measuring relative humidity and temperature in the given space, determining, with a processing unit, whether either of the measured relative humidity and temperature is within the defined relative humidity and temperature limits and generating a warning in an event either the measured relative humidity or temperature is outside the defined relative humidity and temperature limits and determining whether a change in the measured relative humidity is less than the defined change threshold for the given space and generating an alarm in an event the change is greater than the defined change threshold.

According to yet another embodiment, a system for early detection of a cooling-loss event is provided and includes an enclosure to define a given space in which multiple temperature sensitive devices are stored, a relative humidity sensor operably disposed in the given space and an early detection apparatus including an alarm system disposed in signal communication with the relative humidity sensor. The early detection apparatus is configured to initiate the alarm system to generate an alarm in accordance with the relative humidity sensor sensing that a change in a relative humidity in the given space exceeds a defined change threshold for the given space.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The description provided below relates to the use of measurements of relative humidity (RH) sensors to promptly detect critical events involving the loss of cooling capacity in buildings like data centers. The use of the RH measurements may be based on RH and temperature (T) sensor trends and measurements and can also incorporate, if available, pressure (P) sensor measurement for verifying proper air conditioning equipment functioning, air flow, etc.

Figure 1:
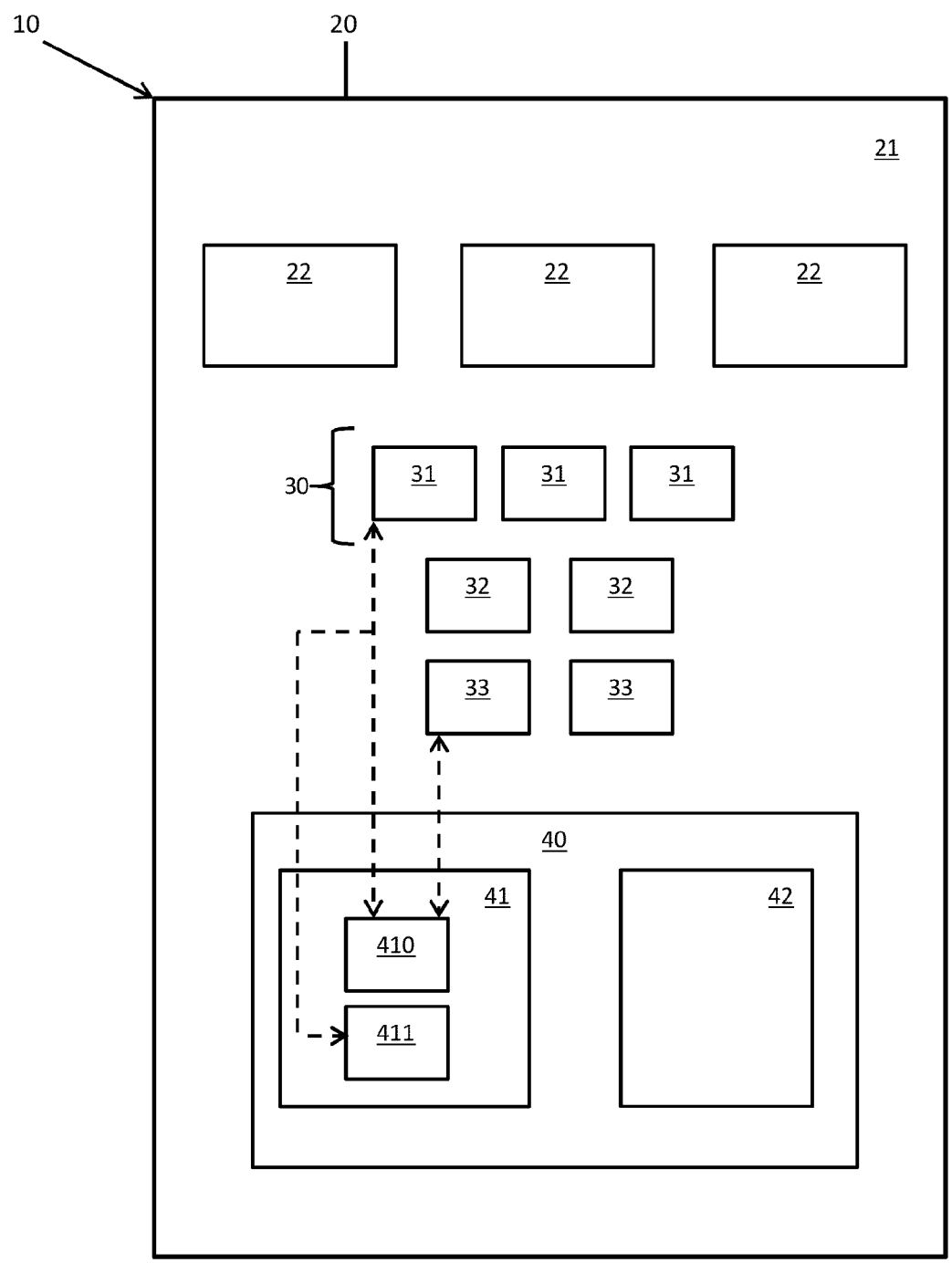
FIG. 1 is a schematic diagram illustrating a system for early detection of a cooling-loss event.

With reference to FIG. 1, a system 10 is provided for early detection of a cooling loss event. The system 10 includes an enclosure 20, one or more relative humidity sensors 30 and an early detection apparatus 40. The enclosure 20 may be provided as a building or room that is formed to define a given space 21 in which multiple temperature sensitive devices 22 are stored. The temperature sensitive devices 22 may include computing or information technology (IT) devices. The one or more relative humidity sensors 30 are operably disposed in the given space 21 to detect relative humidity in the given space 21. To this end, the one or more relative humidity sensors 30 may include a capacitive transducer 31 or a similar device.

In any case, the one or more relative humidity sensors 30 do not present thermal constants and notice immediate (or substantially immediate) changes in relative humidity conditions in the given space 21. Thus, since relative humidity in the given space 21 is proportional to air temperature in the given space 21, the one or more relative humidity sensors 30 can be relied upon to sense immediate changes in both relative humidity and air temperature in the given space 21 such that a failure of a cooling system (i.e., an instance of a cooling-loss event) can be inferred relatively quickly. Depending on its active material, the humidity sensor response characteristics may vary depending on different parameters, like capacitance, resistance or conductivity.

The system 10 may further include one or more pressure sensors 32 and one or more temperature sensors 33 in the given space 21. The pressure sensors 32 can be employed to verify that the air conditioning units in system 10 have their fans operating correctly. The one or more temperature sensors 33 can be used to determine air temperature in the given space 21 as well as a change in the air temperature but will tend to react more slowly than the one or more relative humidity sensors 30 due to their relatively large thermal constants.

The early detection apparatus 40 may include a processing unit 41 and a computer readable medium 42, such as a memory or data storage unit. The computer readable medium 42 has executable instructions stored thereon. When executed, the executable instructions cause the processing unit 41 to operate as described below. In particular, the processing unit 41 may include a warning system 410 and an alarm system 411. The warning system 410 is disposed in signal communication with at least the one or more relative humidity sensors 30 and the one or more temperature sensors 33. The alarm system 411 is disposed in signal communication with at least the one or more relative humidity sensors 30.

Figure 2:
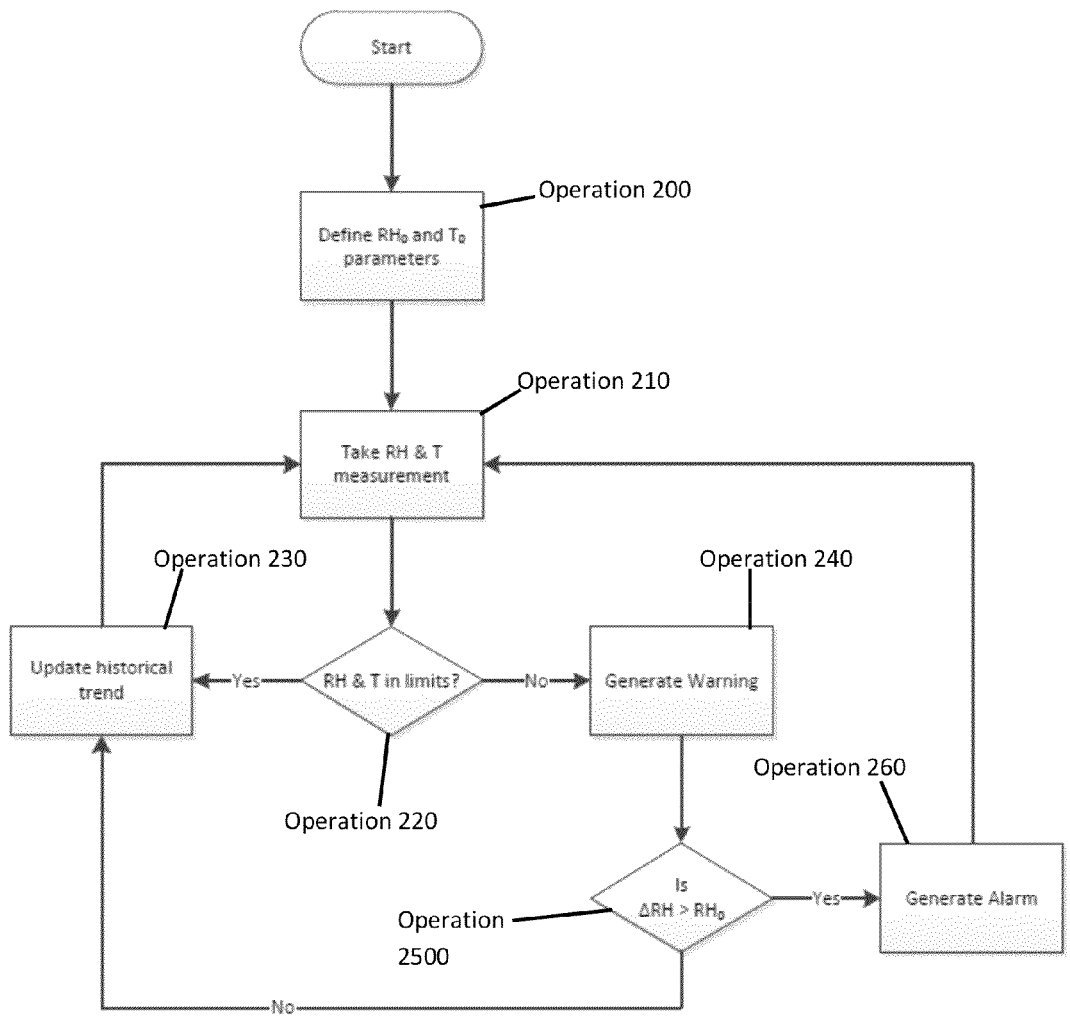
FIG. 2 is a flow diagram illustrating a method of early detection of cooling-loss events in accordance with embodiments.

The executable instructions of the computer readable medium 42 of the early detection apparatus 40 are provided such that the processing unit 41 of the early detection apparatus 40 is configured to operate in accordance with at least the exemplary method illustrated in FIG. 2. As shown in FIG. 2, the processing unit 41 defines initial operational parameters of relative humidity ($RH_0$) and air temperature ($T_0$) for the given space 21 in operation 200. In accordance with embodiments, the initial operational parameters of relative humidity ($RH_0$) may be a baseline relative humidity, high and low relative humidity limits and a relative humidity change threshold within a certain period. Similarly, in accordance with embodiments, the initial operational parameters of air temperature ($T_0$) may be a baseline air temperature, high and low air temperature limits and an air temperature change threshold.

Once the initial operational parameters of relative humidity ($RH_0$) and temperature ($T_0$) for the given space 21 are defined, the processing unit 41 causes the one or more relative humidity sensors 30 and the one or more temperature sensors 33 to measure the relative humidity and air temperature in the given space 21 in operation 210. The processing unit 41 then interrogates the one or more relative humidity sensors 30 and the one or more temperature sensors 33 for their respective readings and determines, in operation 220, whether the relative humidity and air temperature of the given space 21 is within the limits defined in operation 200.

In an event that the relative humidity and air temperature of the given space 21 is within the limits defined in operation 200, the processing unit 41 updates historical trends in operation 230 and returns control to operation 200. In operation 200, the historical trends are considered in the definition of the initial operational parameters. In an event that one of the relative humidity and air temperature of the given space 21 is not within the limits defined in operation 200, the processing unit 41 initiates the warning system 410 to generate a warning that there may be a current risk of a cooling-loss event in operation 240.

Once the warning is generated, in operation 250, the processing unit 41 determines whether a change in the relative humidity of the given space 21 exceeds the relative humidity change threshold defined in operation 200. In an event that the relative humidity of the given space 21 does not exceed the relative humidity change threshold defined in operation 200, the processing unit 41 updates historical trends in operation 230 and returns control to operation 200. In an event that the relative humidity of the given space 21 exceeds the relative humidity change threshold defined in operation 200, the processing unit 41 initiates the alarm system 411 to generate an alarm that there is a cooling-loss event in operation 260 and returns control to operation 200.

Figure 3:
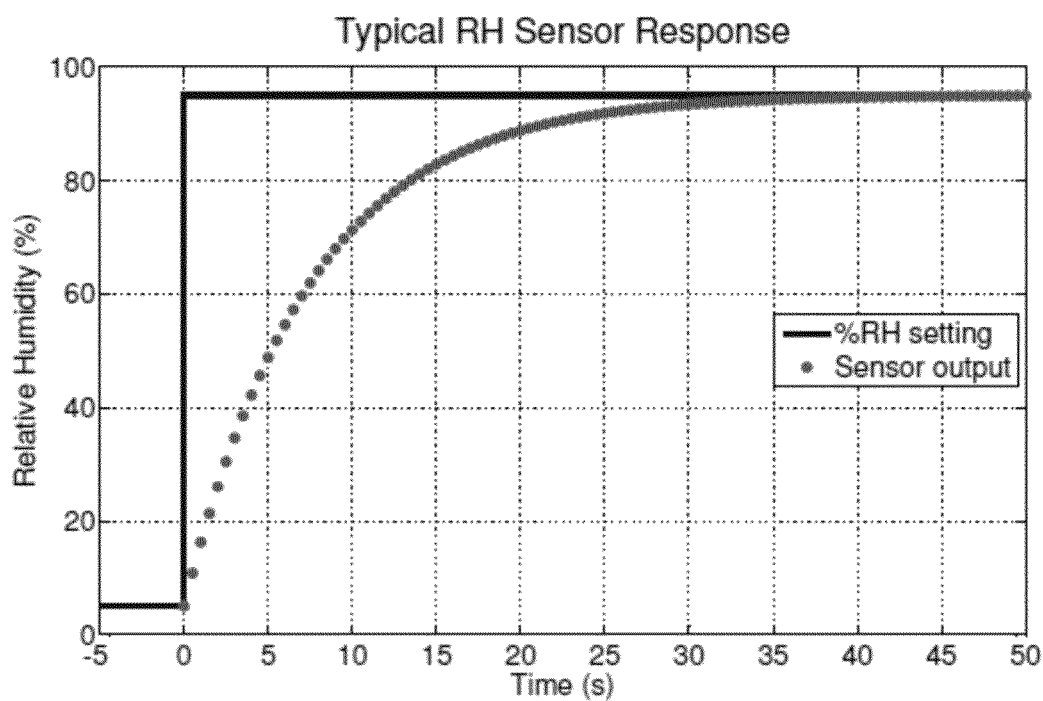
FIG. 3 is a graphical depiction of a response time of a relative humidity sensor.
Figure 4:
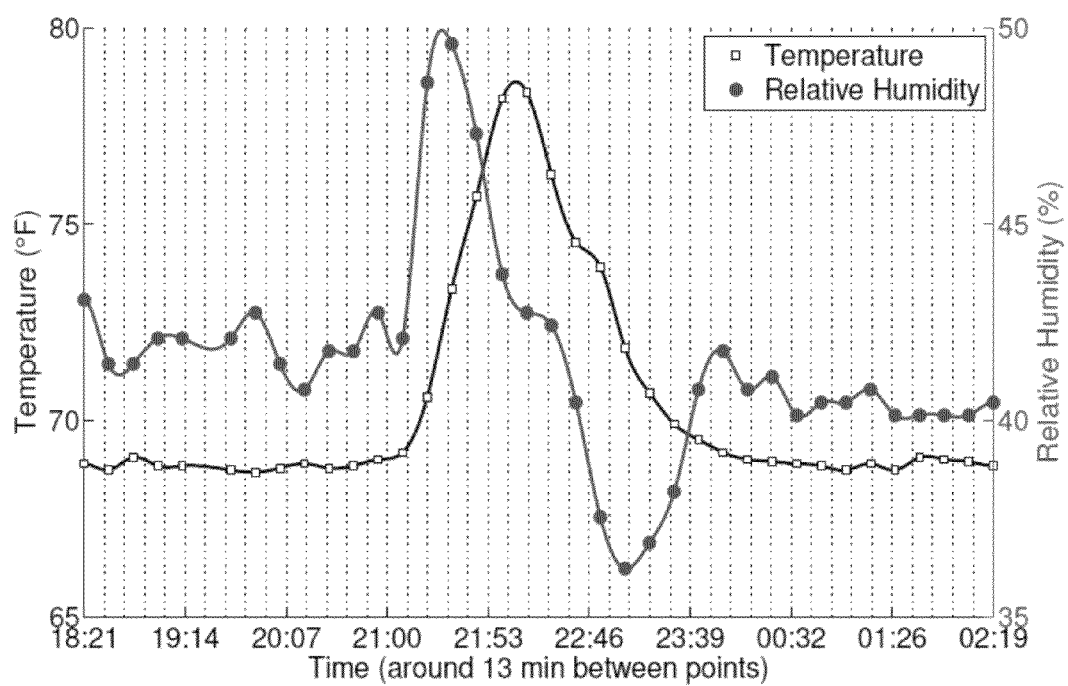
FIG. 4 is a graphical depiction of relative humidity and temperature readings versus timing.

With reference to FIGS. 3 and 4, the advantages of using the one or more relative humidity sensors 30 can be seen. As described above, relative humidity is a unit-less parameter that describes an amount of water vapor in the air of the given space 21 and directly depends on the air temperature. FIG. 3 is a graphical depiction of a typical response of a relative humidity sensor to changes in relative humidity and illustrates that the response time can be measured in seconds. By contrast, with reference to the graphical depiction of relative humidity and temperature readings versus timing in FIG. 4, it can be seen that an increase in a relative humidity of an 80,000 square foot data center that loses cooling capacity precedes the corresponding increase in air temperature by several minutes. As to the disclosure of FIG. 4, a relevant metric is the change in RH, not its absolute value. For example, if water vapor in air is not being extracted during a cooling loss event, everything else being the same, the RH level can increase even if the temperature increases, until equilibrium is reached.

Thus, from the fast response time illustrated in the graph of FIG. 3, it can be inferred that the relative humidity increase will be observed and reacted to by the early detection apparatus 40 due to its reliance upon the one or more relative humidity sensors well before the temperature increase and certainly before a detection apparatus relying only on temperature sensors would be able to react.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for early detection of a cooling-loss event, the system comprising:
   an enclosure to define a given space in which multiple temperature sensitive devices are stored to detect an air temperature in the given space;
   a relative humidity sensor operably disposed in the given space;
   an early detection apparatus including an alarm system disposed in signal communication with the relative humidity sensor,
   the early detection apparatus being configured to initiate the alarm system to generate an alarm of a cooling loss event prior to the multiple temperature sensitive devices sensing effects of the cooling loss event in accordance with the relative humidity sensor sensing that a change in a relative humidity in the given space exceeds a defined change threshold for the given space in a period of time that is shorter than a period of time required for the multiple temperature sensitive devices to sense the effects of the cooling loss event; and
   a temperature sensor to sense a temperature of the given space,
   wherein the early detection apparatus comprises a warning system and is configured to generate a warning in an event the relative humidity sensor senses that relative humidity in the given space is outside a defined relative humidity limit or the temperature sensor senses that a temperature of the given space is outside a defined temperature limit.

2. The system according to claim 1, wherein the multiple temperature sensitive devices comprise computing devices.

3. The system according to claim 1, wherein the multiple temperature sensitive devices comprise information technology (IT) devices.

4. The system according to claim 1, wherein the relative humidity sensor comprises a capacitive transducer.

5. The system according to claim 1, further comprising a pressure sensor to verify a reading of the relative humidity sensor.

6. The system according to claim 1, wherein the early detection apparatus comprises a warning system and is configured to generate a warning in an event the relative humidity sensor senses that relative humidity in the given space is outside a defined relative humidity limit.

7. The system according to claim 1, wherein the early detection apparatus comprises:
   a processing unit; and
   a non-transitory computer readable medium having executable instructions stored thereon, which, when executed, cause the processing unit to determine that the relative humidity sensor senses that a change in a relative humidity in the given space exceeds a defined change threshold for the given space and to initiate the alarm system to generate the alarm accordingly.

8. The system according to claim 7, wherein, when executed, the executable instructions further cause the processing unit to define the change threshold for the given space and to update the defined change threshold for the given space in certain circumstances.

* * * * *